(12) United States Patent
Turley, Jr. et al.

(10) Patent No.: US 9,568,160 B2
(45) Date of Patent: Feb. 14, 2017

(54) LAMP WITH A REFLECTOR

(71) Applicant: Grote Industries, Inc., Madison, IN (US)

(72) Inventors: Richard E. Turley, Jr., Deputy, IN (US); Rob E. Reese, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 844 days.

(21) Appl. No.: 13/891,479

(22) Filed: May 10, 2013

(65) Prior Publication Data

US 2014/0334145 A1 Nov. 13, 2014

(51) Int. Cl.
| | |
|---|---|
| F21V 7/00 | (2006.01) |
| F21S 8/10 | (2006.01) |
| F21V 13/06 | (2006.01) |
| F21V 14/04 | (2006.01) |
| B60Q 1/068 | (2006.01) |

(52) U.S. Cl.
CPC ......... *F21S 48/1757* (2013.01); *B60Q 1/0683* (2013.01); *F21S 48/1104* (2013.01); *F21S 48/1109* (2013.01); *F21S 48/1159* (2013.01); *F21S 48/1208* (2013.01); *F21S 48/1233* (2013.01); *F21S 48/1305* (2013.01); *F21S 48/1752* (2013.01); *F21S 48/321* (2013.01); *F21S 48/328* (2013.01); *F21V 13/06* (2013.01); *F21V 14/04* (2013.01)

(58) Field of Classification Search
CPC ....... F21V 13/06; F21V 14/04; F21S 48/1757; F21S 48/1752; F21S 48/321; F21S 48/1104; F21S 48/1109; F21S 48/1159; F21S 48/1208; F21S 48/1233; F21S 48/1365; F21S 48/328
USPC ................................ 362/232, 347, 516, 548
See application file for complete search history.

(56) References Cited

U.S. PATENT DOCUMENTS

| | | | |
|---|---|---|---|
| 5,023,759 A | 6/1991 | Eckenrode | |
| 5,331,519 A * | 7/1994 | Fujino ................. | B60Q 1/0683 362/289 |
| 5,339,226 A | 8/1994 | Ishikawa | |
| 5,343,371 A | 8/1994 | Kobayashi et al. | |
| 5,373,424 A | 12/1994 | Ishikawa | |
| 5,379,196 A | 1/1995 | Kobayashi et al. | |
| 6,220,731 B1 * | 4/2001 | Ryan ........................ | F21V 9/08 362/217.07 |
| 6,293,686 B1 | 9/2001 | Hayami et al. | |
| 6,315,439 B1 | 11/2001 | Denley | |
| 6,641,292 B2 | 11/2003 | Miki et al. | |
| 6,779,912 B2 | 8/2004 | Krieg et al. | |
| 6,796,693 B2 | 9/2004 | Clinch et al. | |
| 6,799,874 B2 * | 10/2004 | Nakata ................ | F21S 48/1388 362/277 |
| 7,052,165 B2 * | 5/2006 | Field .................... | B60Q 1/1415 362/512 |
| 7,182,491 B2 | 2/2007 | Cajanek et al. | |
| 7,264,376 B2 | 9/2007 | Burton | |

(Continued)

*Primary Examiner* — Bryon T Gyllstrom
(74) *Attorney, Agent, or Firm* — Woodard, Emhardt, Moriarty, McNett & Henry LLP

(57) ABSTRACT

A lamp is disclosed. The lamp has a housing, at least one light source in the housing, and a reflector. The reflector has a light reflective surface facing said light source. The reflector and its light reflective surface is movable with respect to said light source along a path-of-movement to reflect at least a portion of light from the source to provide an adjustable, generally forwardly directed light beam.

34 Claims, 13 Drawing Sheets

(56) References Cited

U.S. PATENT DOCUMENTS

| | | | | |
|---|---|---|---|---|
| 8,038,321 B1* | 10/2011 | Franck | ............ | F21S 8/026 |
| | | | | 362/249.02 |
| 8,038,327 B1* | 10/2011 | Franck | ............ | F21V 3/049 |
| | | | | 362/249.02 |
| 8,240,896 B2* | 8/2012 | Abe | ............ | F21S 48/1159 |
| | | | | 362/281 |
| 8,398,279 B2 | 3/2013 | Lee | | |
| 8,911,128 B2* | 12/2014 | Takahashi | ......... | B82Y 20/00 |
| | | | | 362/259 |
| 9,028,106 B2* | 5/2015 | Kishimoto | ......... | F21S 48/115 |
| | | | | 362/259 |
| 2005/0105301 A1* | 5/2005 | Takeda | ............ | F21S 48/1154 |
| | | | | 362/545 |
| 2006/0232985 A1* | 10/2006 | Wang | ............ | B60Q 1/245 |
| | | | | 362/425 |
| 2007/0291487 A1* | 12/2007 | Lee | ............ | B60Q 1/12 |
| | | | | 362/271 |
| 2008/0089085 A1* | 4/2008 | Popelek | ......... | F21S 48/1757 |
| | | | | 362/514 |
| 2009/0316384 A1 | 12/2009 | Kanayama et al. | | |
| 2010/0246201 A1* | 9/2010 | Brendle | ......... | F21S 48/1104 |
| | | | | 362/519 |
| 2012/0106188 A1* | 5/2012 | Takahashi | ......... | F21S 48/1241 |
| | | | | 362/516 |

* cited by examiner

LAMP WITH A REFLECTOR

BACKGROUND

The present invention relates to electrical lamps, such as for example LED lamps, having reflectors.

Many, and perhaps most, lamps with reflectors are such that the reflector is not movable and/or centrally located. However, some have movable reflectors, typically movable with the reflector and light source being commonly mounted and thus moving together. Such movable reflectors typically have one or more hinge-joints about which the reflector (and light source) pivot for adjustment. These arrangements are suitable in several lamp arrangements, and thus have become conventional.

Yet, there is a need for improvement in this field. Such arrangements can be limiting and/or present other problems, such as not providing for side adjustment, limiting component placement and/or otherwise.

SUMMARY

The invention is set forth by the claims and only the claims. Generally, it can be summarized as a lamp with a reflector. The lamp has a housing, at least one light source in the housing, and a reflector. The reflector has a, light reflective surface facing said light source. The reflector and its light reflective surface is preferably movable with respect to said light source along a path-of-movement to reflect at least a portion of light from the source to provide an adjustable, generally forwardly directed light beam.

The lamp may have one or more optional features as claimed. This may include: having the reflector move along a curved path of movement without a hinge-joint; having the light source comprise an LED mounted on the side of the housing; and/or having a curved track along which the reflector is movable to cause said light reflective surface to move along a curved path-of-movement.

The solves the problem of how to changing a lamp's light beam direction and/or how to position a reflector vis-à-vis a light source, like an LED and/or its heat sink. Further forms, objects, features, aspects, benefits, advantages, and embodiments of the present invention will become apparent from a detailed description and drawings provided herewith.

BRIEF DESCRIPTION OF THE DRAWING FIGURES

DESCRIPTION OF THE SELECTED EMBODIMENTS

Figure 1:
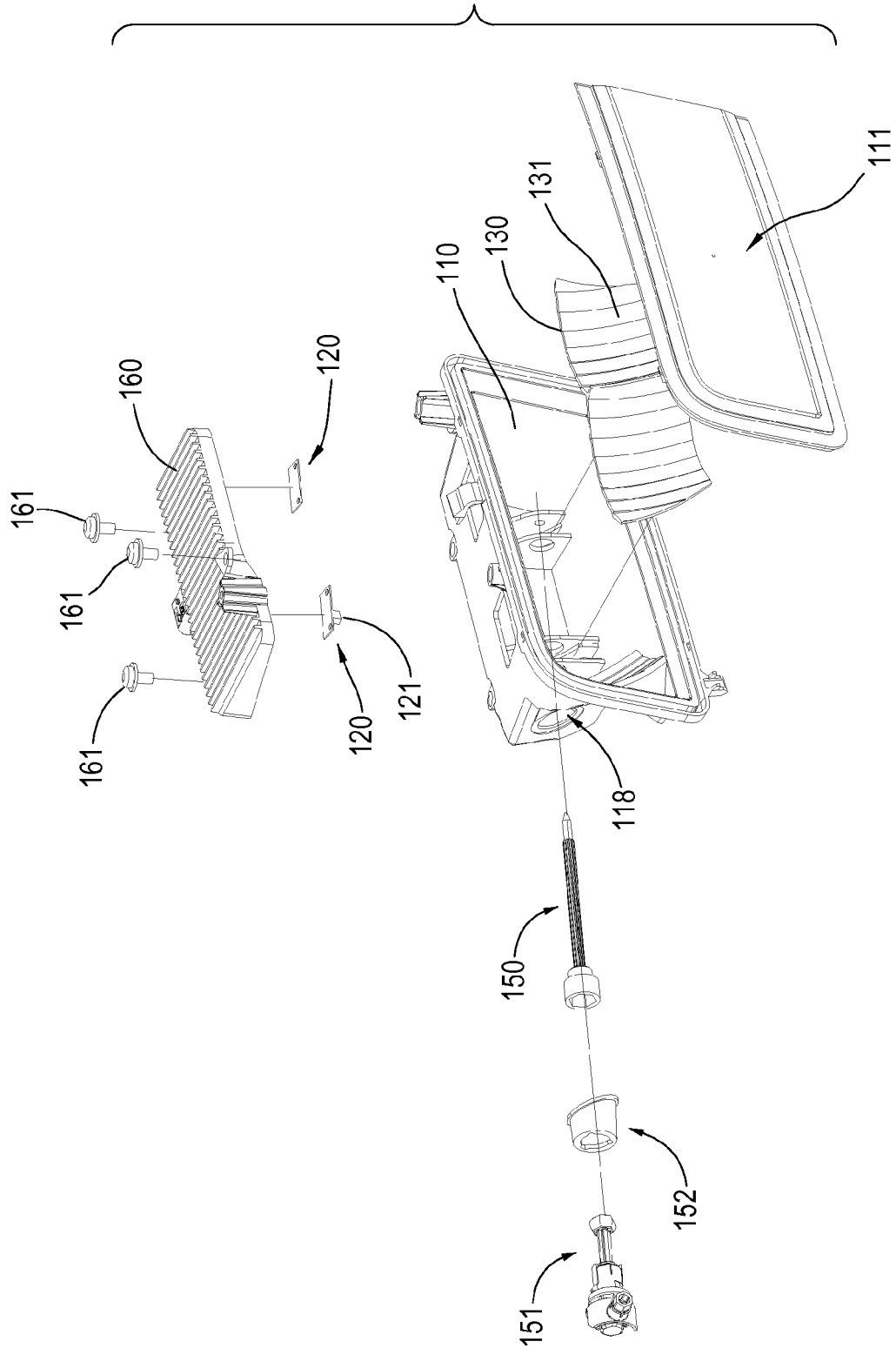
FIG. 1 is a top-front perspective exploded view of a lamp.
Figure 2:
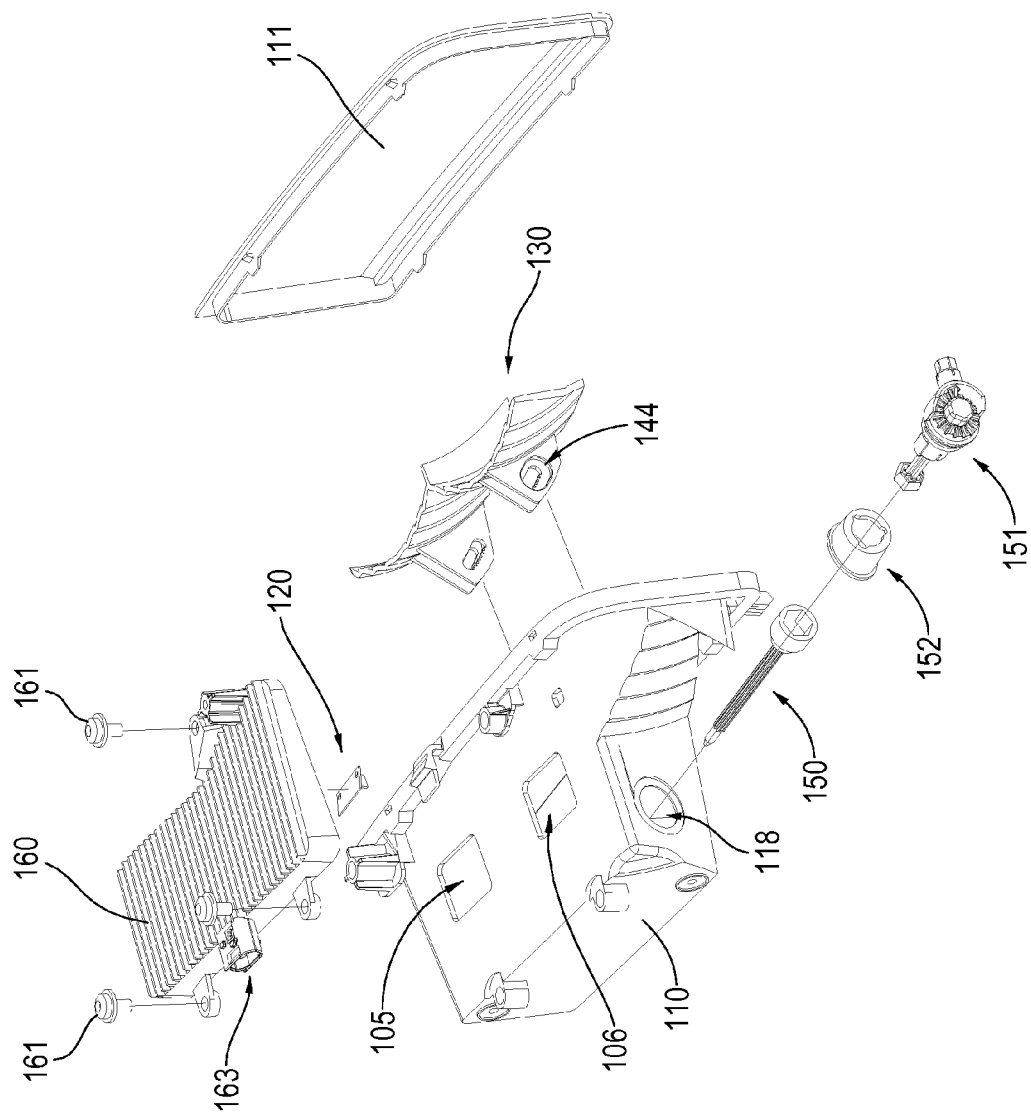
FIG. 2 is a rear-top exploded view of the device of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Referring to the FIGS. 1-15, example lamp arrangements are shown. Such lamps may have a variety of uses, including without limitation as a vehicle lamp. Preferably, when the lamp is a vehicle lamp it is sealed against moisture. Preferably, when the lamp is a vehicle lamp it is FMVSS 108 compliant. The lamp reflector may be adjustable up-down, right-left, or both. It may be manually, motor, computer and/or otherwise adjusted.

A lamp 100 is shown (FIGS. 1-8A, 9-15), comprising a housing 110, at least one light source 121 in the housing; and, a reflector 130. The reflector comprises a light reflective surface 131 facing the light source 121. The reflector and its light reflective surface optionally, but preferably, is movable with respect to the light source along a path-of-movement M (curved or straight, but preferably curved) of the reflector to reflect at least a portion of light from the source to provide an adjustable, generally forwardly directed light beam (see for example, light beam(s) L in FIGS. 8A-C, etc.).

Optionally, but preferably, as shown with example 100, reflector does not have a hinge-joint about which to pivot. For example, optionally instead a curved track 140 may be provided. When the reflector is movable, it may be moveable with respect to the light source; however, in some embodiments it may be moveable (such as with respect to the housing) but not moveable with respect to the light source (such as for example where the light source is mounted to, or commonly mounted with, the reflector).

Optionally, but preferably the reflector is positioned, at least in part, behind (see FIG. 7) (and/or optionally below or above or to another side of) the light source. And, optionally, the light source 121 (LED or otherwise) may be mounted between the lens 111 and the reflector 130, (see for example, FIGS. 8D and 8E), such as by being cantilevered over the reflector and/or on a mount extending from the reflector or lens or extending generally axially (Z-axis) through an opening in the reflector. Instead of or in addition to this between arrangement, the light source(s) may be mounted to the side(s) of the reflector (see e.g. FIG. 1).

Figure 3:
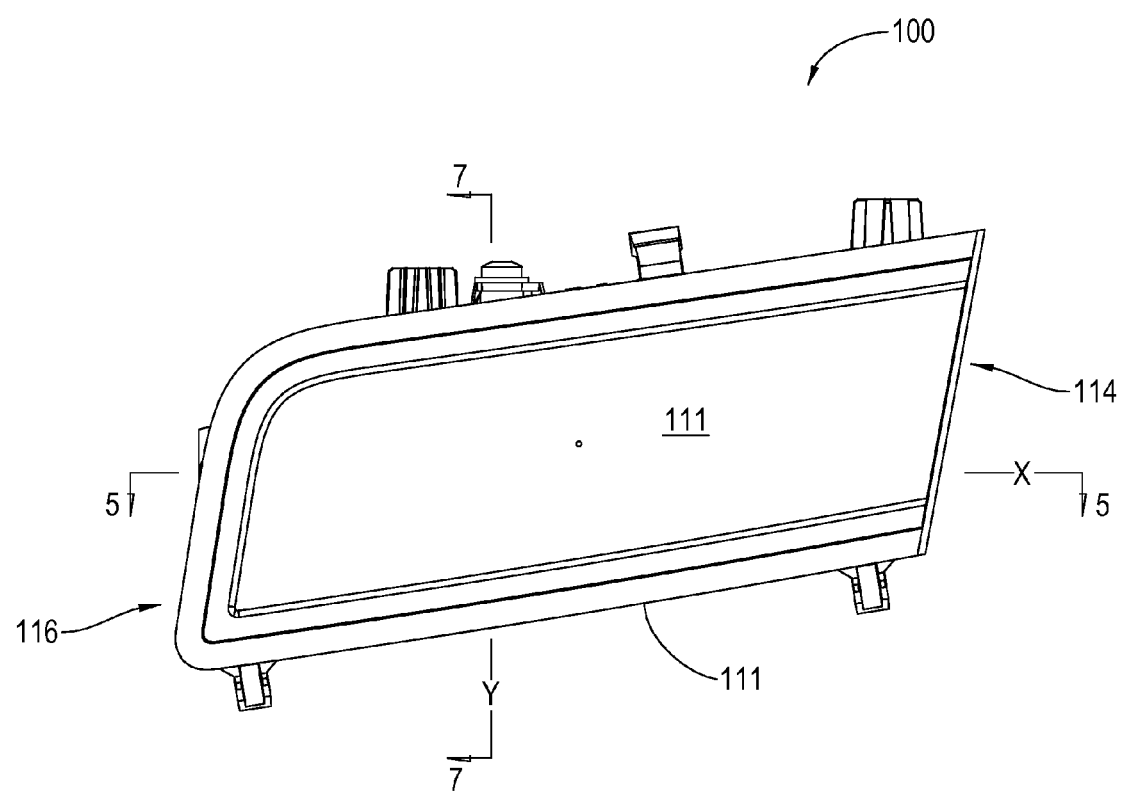
FIG. 3 is a front elevation view, assembled, of the lamp of FIG. 1.
Figure 4:
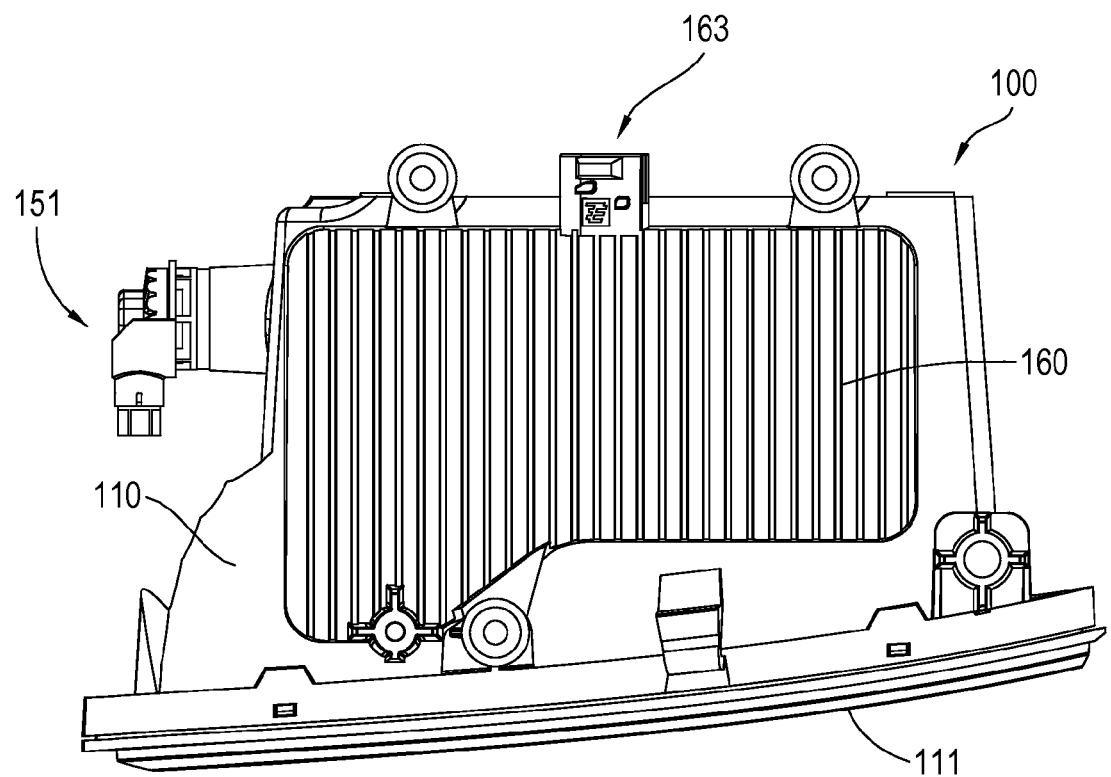
FIG. 4 is a top plan view of the lamp of FIG. 3.
Figure 5:
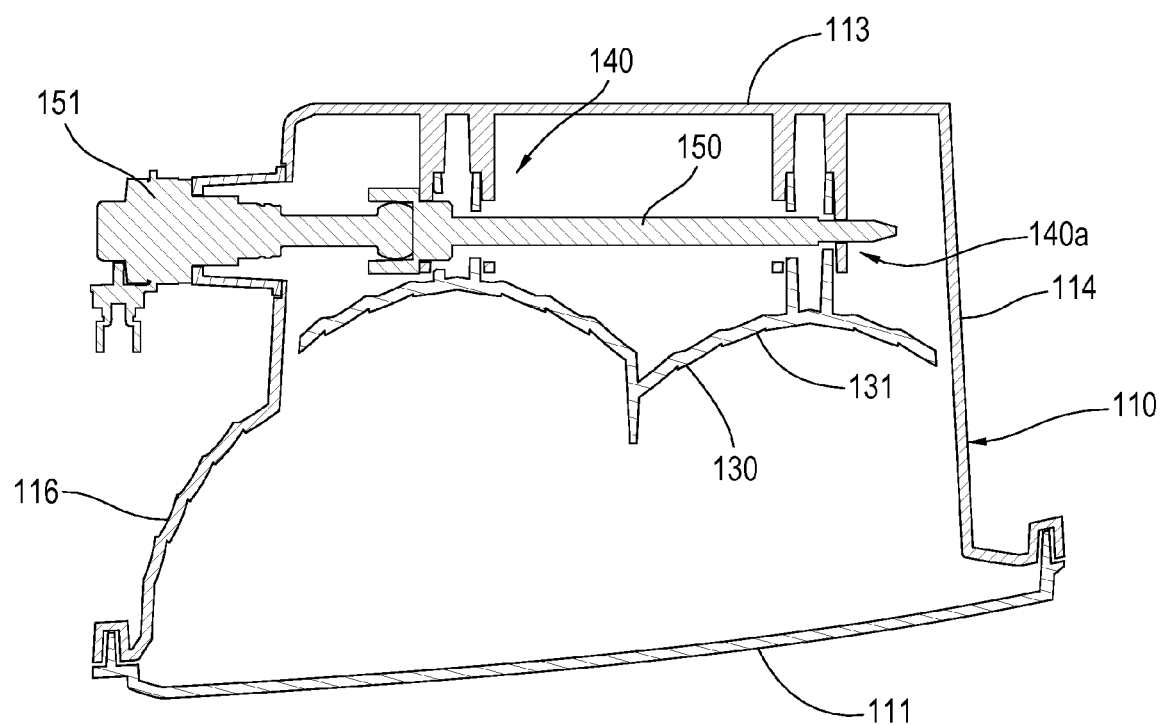
FIG. 5 is a top plan sectional view of the lamp of FIG. 3 taken along cut line 5-5 of FIG. 3.
Figure 6:
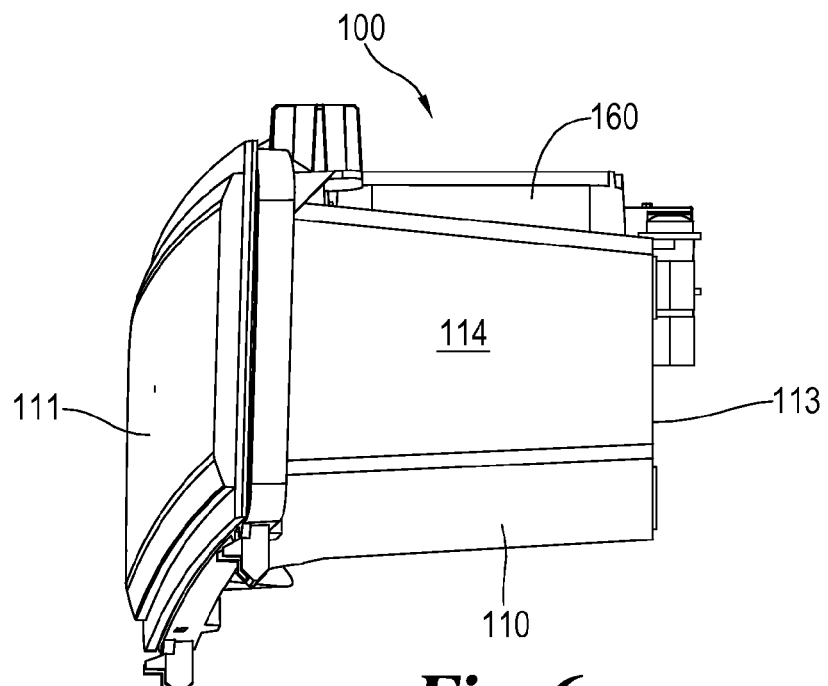
FIG. 6 is a side elevation view of the lap of FIG. 3.

Note in the example lamp 100 the Z-axis is perpendicular to both the X-axis and Y-axis depicted in FIG. 3. Also for reference to this one example, housing 110 has sides: top side 112, back side 113, right side 114, bottom side 115, left side 116 and front side at lens 111. Other geometries, such as circles, curves, cylinders and otherwise may have one or more of such sides blended and/or forming regions of surfaces.

Figure 8A:
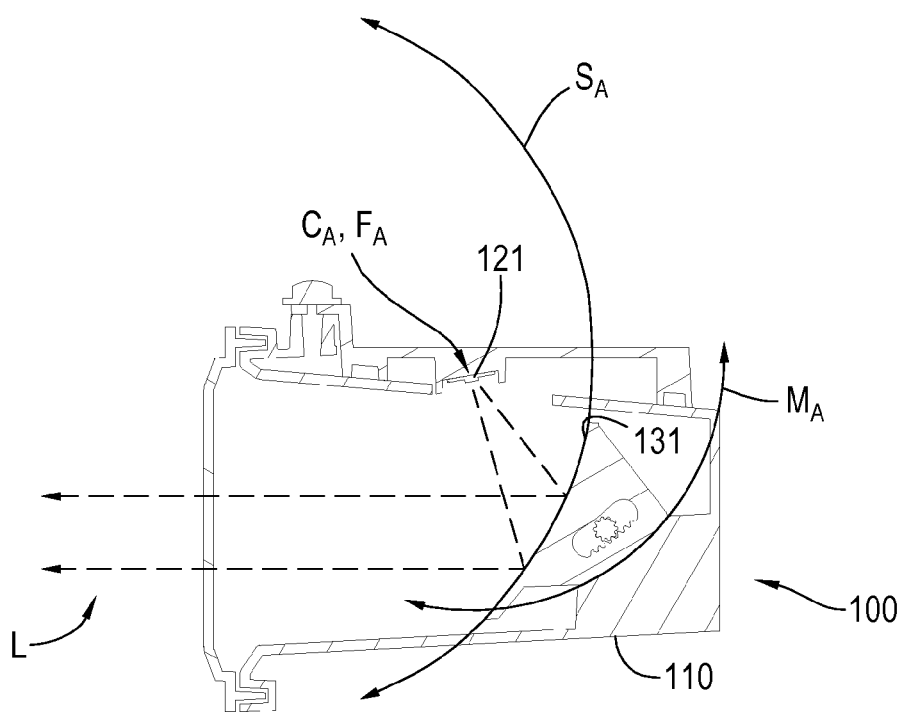
FIGS. 8A-8F illustrate some examples of various geometric relationships of lamp parts.

Optionally, with a path of movement that is curved, the curved path-of-movement defines a center of revolution C (see FIGS. 8A-F) radially inward thereof. That center of revolution $C_A$ may be locatable generally coincident with the light source 121, as shown in the examples of FIGS. 8A and 8D.

In the one example of lamp 100 and its illustrated gear rack 145, the reflector may be moved about plus or minus eight (8) degrees, for a total movement around center of revolution $C_A$ of about 16 degrees. However, any degree of movement may be used. However, preferably the total movement around a center of revolution is less than about 45 degrees.

Optionally, the concave light reflective surface is curved, and may have a focus F. It may be generally parabolic and with a parabola focal point locatable generally coincident with said light source 121, wherein movement of the reflector alters direction of the light beam. Optionally, but preferably this provides for such beam direction movement without altering (or substantially altering) the beam shape.

Optionally, a lens or lenses may be provided on the light source, between the light source(s) and the reflector(s), and/or forwardly of the reflector(s), or not. Thus, as but one further example, an optical lens may optionally be located on the light source or between the light source and the reflector, with the reflector being at or near planar (see e.g. FIG. 8C, lens 390), resulting in collimated light from the lamp.

Figure 7:
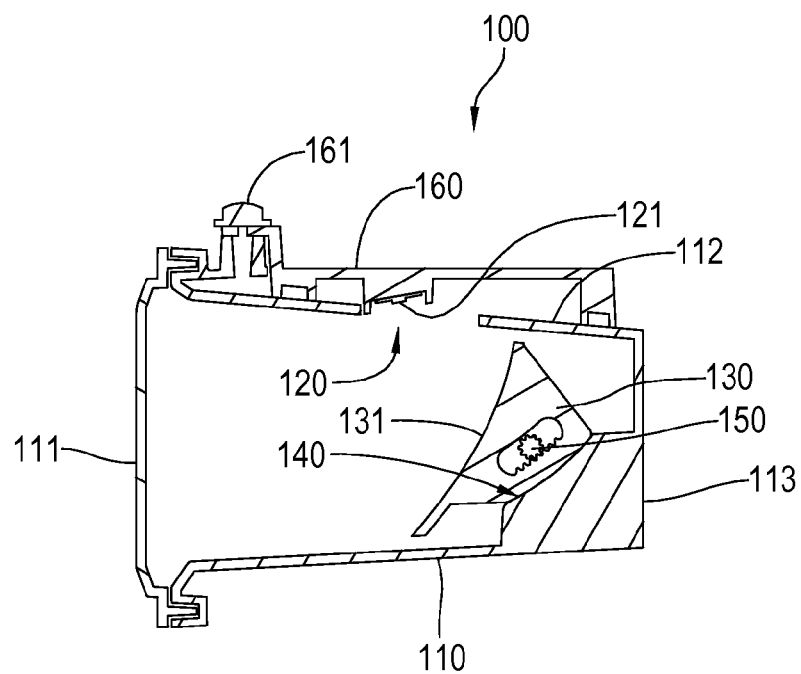
FIG. 7 is a right elevation sectional view of the lamp of FIG. 3 taken along cut line 7-7 of FIG. 3.

Optionally, but preferably, the light source 121 comprises an LED, although it may be otherwise. Optionally, the LED is mounted on a side (top, bottom, left side and/or right side) of the housing to emit light toward said reflector. In such case, normally the reflector is not only behind the light source, but also at least partially to the side of the light source. For example, note that in FIGS. 1-8A, reflector's light reflective surface is parabolic, but is less than about one-half of a parabola (axially). For example, FIGS. 7 and 8A show the reflector surface 131 comprises a portion of a parabola which is lateral to a central Z-axis of the parabola Greater or lesser portions of a curved reflector may be optionally used as well. And, the reflector may, optionally, be entirely or substantially behind the light source. Optionally, instead or addition to a light source being located in front of or otherwise separate from the reflector, one or more light source may be located on, in or even behind a reflector (such as the reflector having openings therein for light passage and/or being in the nature of a one way mirror reflecting light from one side while allow light transmission from the other side.

FIGS. 8A-8F illustrate some examples of various geometric relationships of lamp parts. FIG. 8A is the same as FIG. 7, with a circle corresponding to path-of-movement $M_A$ superimposed, and with a light reflective surface 131's shape $S_A$ superimposed. The shape $S_A$ in this example is parabolic, with a focal point $F_A$ which coincides with light source 121 and coincides with the center of revolution $C_A$ of the (circular) path-of-movement $M_A$. The light beams L are collimated.

Figure 8B:
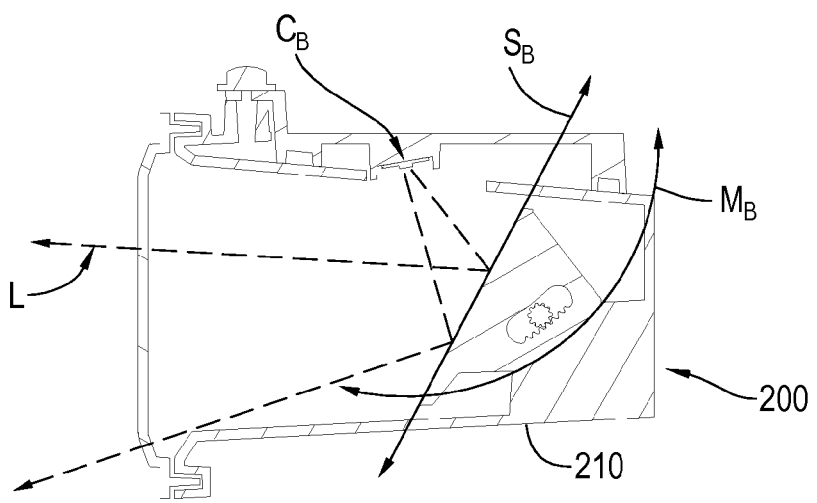

FIG. 8B shows lamp 200 (with housing 210), like lamp 100, but with a flat or planar light reflective surface 231's shape $S_B$ superimposed. The reflective surface is shown with a curved path-of-movement $M_B$, in this example circular path like FIG. 8A around center of revolution $C_B$. The light beams L are not collimated.

Figure 8C:
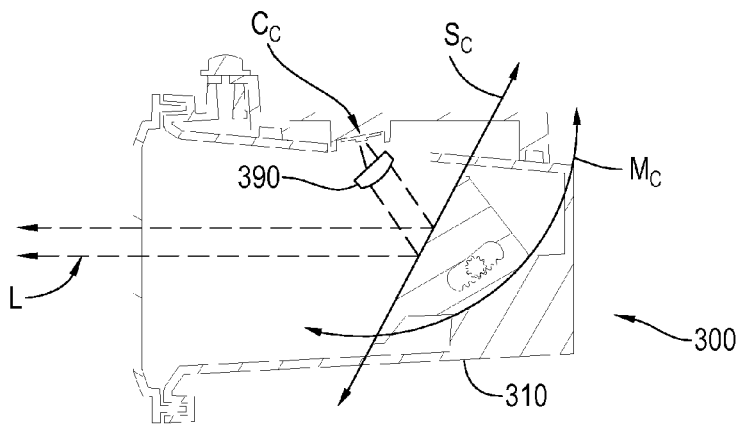
Figure 8D:
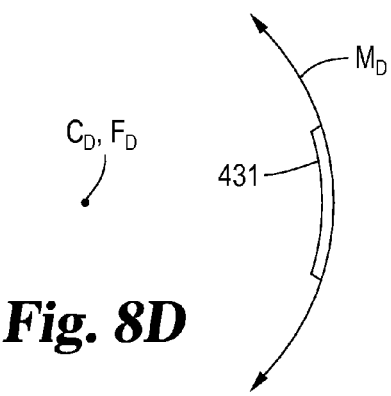

FIG. 8C shows lamp 300 (with housing 310), like lamp 200, and with lens 390 between the light source and the reflector to alter the light beams. In this case, the light beams L are collimated. The reflective surface is shown with a curved path-of-movement $M_C$, around center of revolution $C_C$.

FIG. 8D shows an arrangement for a lamp (as claimed) with light reflective surface 431 having a circular (cylindrical or spherical) shape and around center of revolution $C_D$ and around a coincident focus $F_D$. The path-of-movement $M_D$ is shown as curved, in this case circular. It optionally could be another curve. Optionally some or all of the light source(s) (not shown here) may be coincident with $F_D$ and $M_D$, (in which case such light source(s) would be in front of the reflector, but not be off to the side of the reflector), or not so coincident.

Figure 8E:
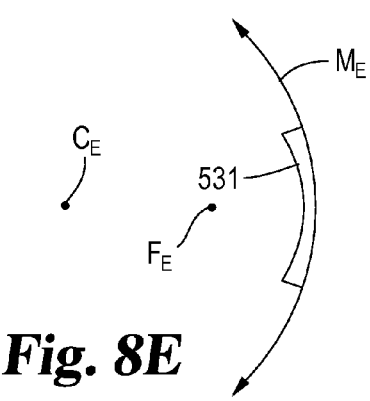

FIG. 8E shows an arrangement for a lamp (as claimed) with light reflective surface 531 having a parabolic (parabolic cylindrical or paraboloid) shape and around focus (and focal point) $F_E$. The path-of-movement $M_E$ is shown as curved, in this case circular. Focus $F_E$ and center of revolution $C_E$ are not coincident in this example. It optionally could be another curve. Optionally some or all of the light source(s) (not shown here) may be coincident with $F_D$ and/or $M_D$, (in which case such light source(s) would be in front of the reflector, but not be off to the side of the reflector), or not so coincident.

Figure 8F:
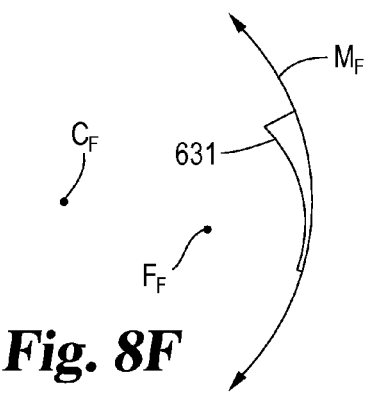
Figure 9:
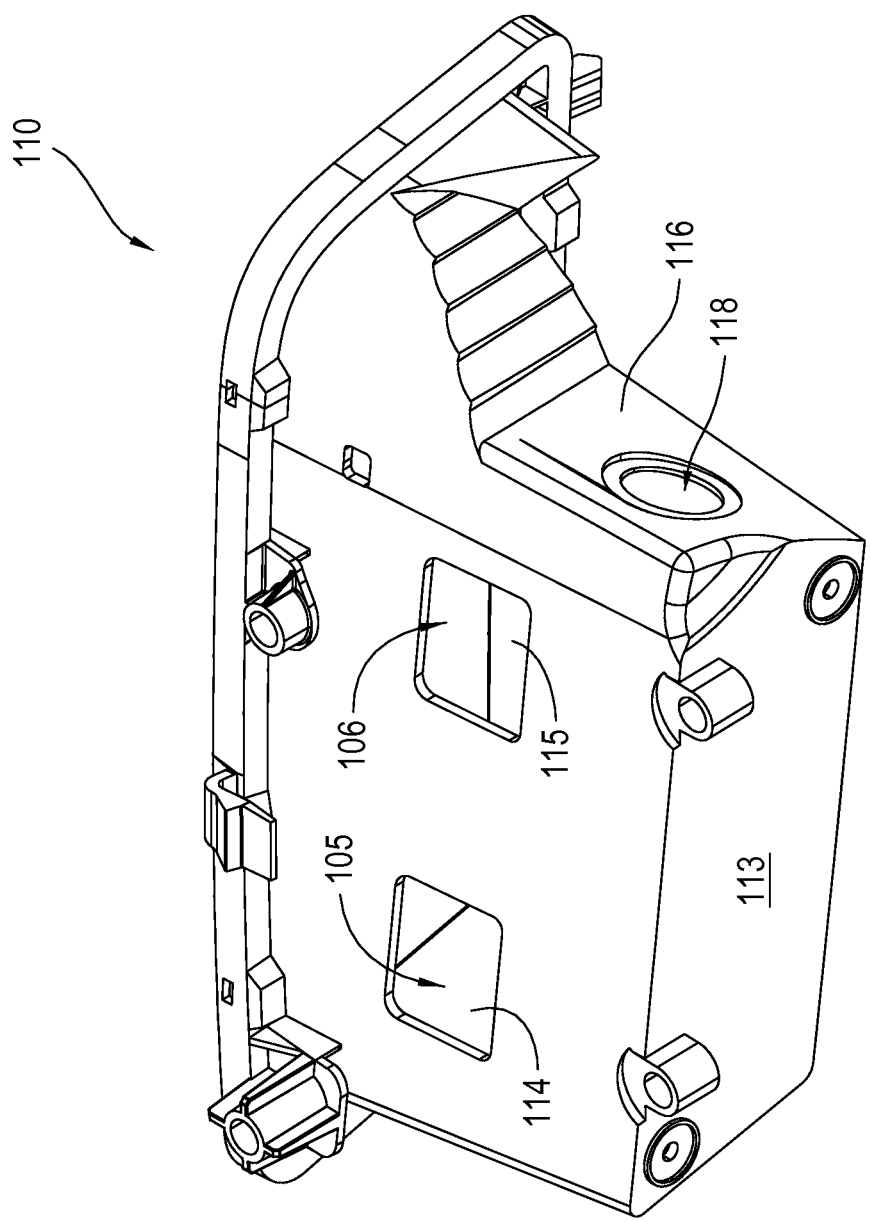
FIG. 9 is a top-rear perspective view of a housing of FIG. 1.
Figure 10:
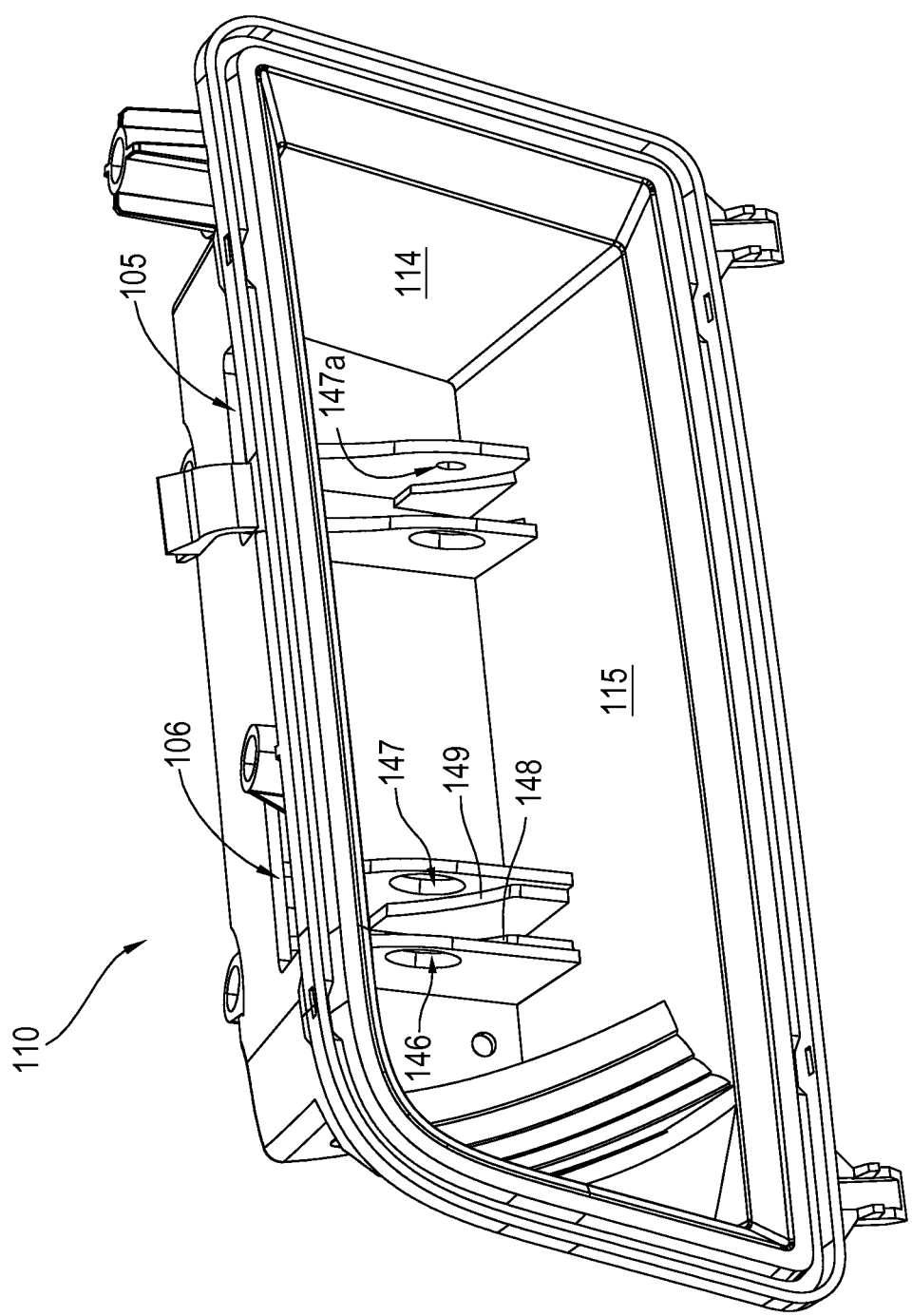
FIG. 10 is a top-front perspective of the housing of FIG. 9.
Figure 11:
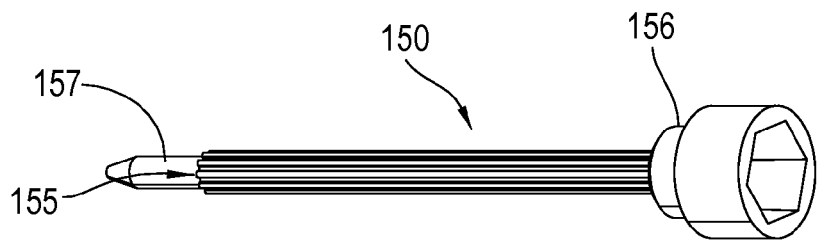
FIG. 11 is a perspective view of a shaft as used in the lamp of FIG. 1.

FIG. 8F shows an arrangement for a lamp (as claimed) with light reflective surface 631 having a parabolic (parabolic cylindrical or paraboloid) shape and around focus (and focal point) $F_F$. The path-of-movement $M_F$ is shown as curved, in this case circular. Focus $F_F$ and center of revolution $C_F$ are eccentric to each other, and are not coincident in this example and also are not collinear along the Z-axis.

In the various examples, such as FIGS. 8A-F, and in particular FIGS. 8D-F, the light source(s) may be coincident with one or both of the center(s) of revolution and/or the focus, or not.

Such geometric part and surface shapes, relationships and positions may be mixed and/or matched within the literal language of the claims, and FIGS. 8A-F are merely examples. Note also that one or more of a focus, focal point, center of revolution and/or light source may coincide at some point(s) along a path-of-movement, and not others, and still comprise the invention, such as when the focus and the center of revolution do not coincide and/or when the light source and the center of revolution do not coincide. Thus, for example in FIG. 8A, the focal point, light source 121 and center of revolution all coincide when the gear rack is central on shaft 150; however, there is a small divergence of coincident as between the focal point and the light source as the reflector is moved one direction or the other along the path of movement $M_A$.

Optionally, the light source(s) (LED or otherwise) may be mounted on a circuit board module 120, and wherein the light source 121 and its circuit board module are readily removable from the lamp 100 for replacement of the light source. Further, optionally, the circuit board module may be mounted to a metal heat sink 160, and wherein the heat sink is mounted to said housing (externally, internally, both, integral with the housing or otherwise) of the housing and on a side of the housing. This may be done with a movable or non-moveable reflector. For example, FIGS. 1-7 shows the heat sink mounted on the top side, external of the housing.

For example, FIGS. 1-7 show the use of screws 161 to mount a heat sink to the housing, although other mountings or arrangements are also optional.

Another option is that the housing has at least one opening 105, 106 in a side 112 thereof, and wherein the light source 121 and/or the circuit board module 120 extends through said opening. This may be done with a movable or non-moveable reflector. For example, the LED may be located in said housing and be removable through the side opening. Optionally, the electric power supplied to the light source may come from a coupling, such as socket plug 163 (FIGS. 1, 2, 4) shown in this example in the heat sink.

As mentioned, one preferred approach is to have a curved track 140 along which the reflector is movable to cause the light reflective surface to move along said curved path-of-movement P. This may take many different forms. This may include rails, grooves, cams and cam followers, slots (including longitudinally curved slots). One example may include curved slots which are, on their inside edge, gear racks. There may be a gear-gear rack interface to move the reflector's light reflective surface along a curved path-of-movement. For example, as shown in FIGS. 1-7 and 9-14, gears in the form shown as splines 155 (see FIG. 11) may interface with gear rack(s) 145 and/or 145a. In this example, such gear racks are curved and formed on an inside surface of a slot in a flange on reflector 130. Curved surfaces 143 and 148 (FIGS. 10, 12 and 15) engage and are slide-able with respect to each other during reflector movement, as are curved surfaces 142 and 149 (FIGS. 10, 12 and 154) (see also FIG. 8A along path-of-movement $M_A$. Similar surfaces are shown with respect to the other slide's curved track 140a (FIG. 5), helping provide better stability.

Figure 12:
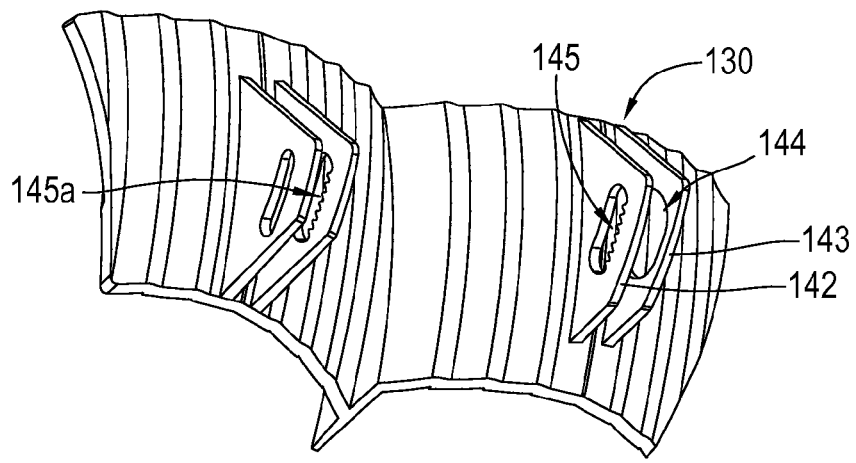
FIG. 12 is a rear-bottom perspective of the reflector of the lamp of FIG. 1.
Figure 13:
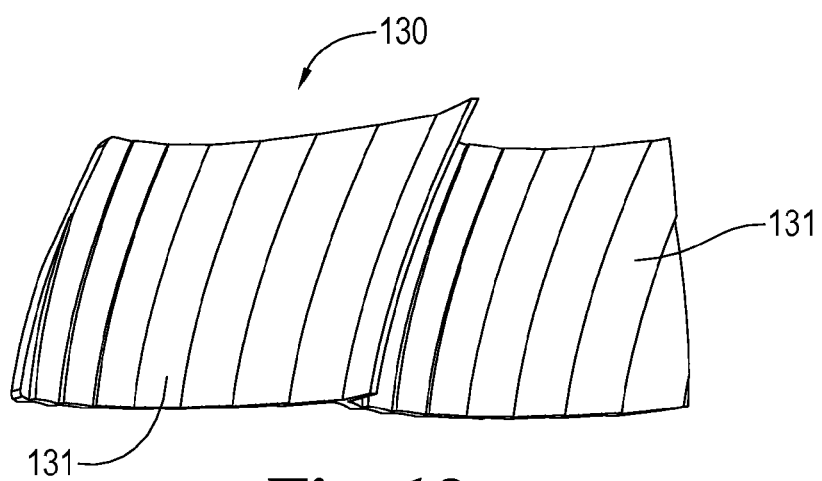
FIG. 13 is a front-bottom view of a reflector of the lamp of FIG. 1.
Figure 14:
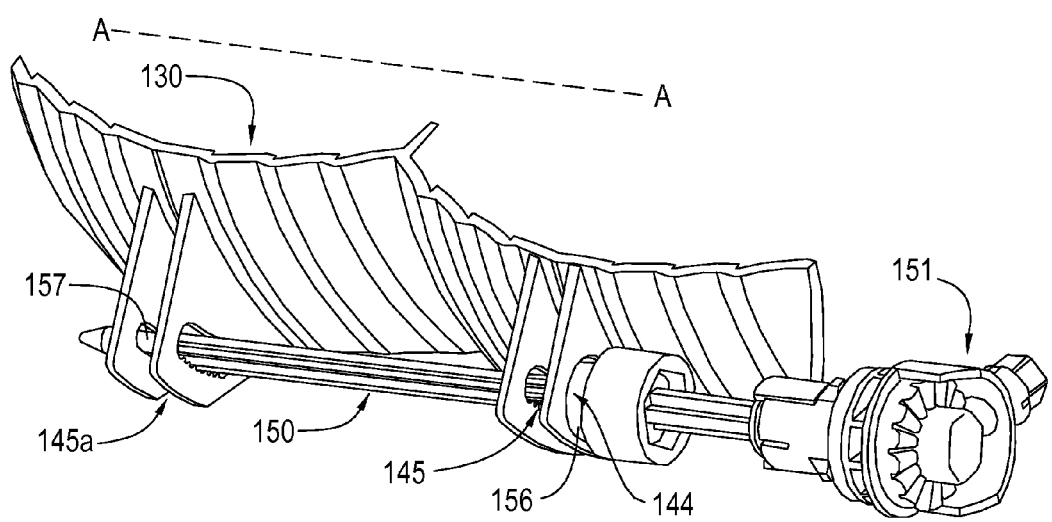
FIG. 14 is a top-rear perspective view of selected elements of the assembly of FIG. 1.
Figure 15:
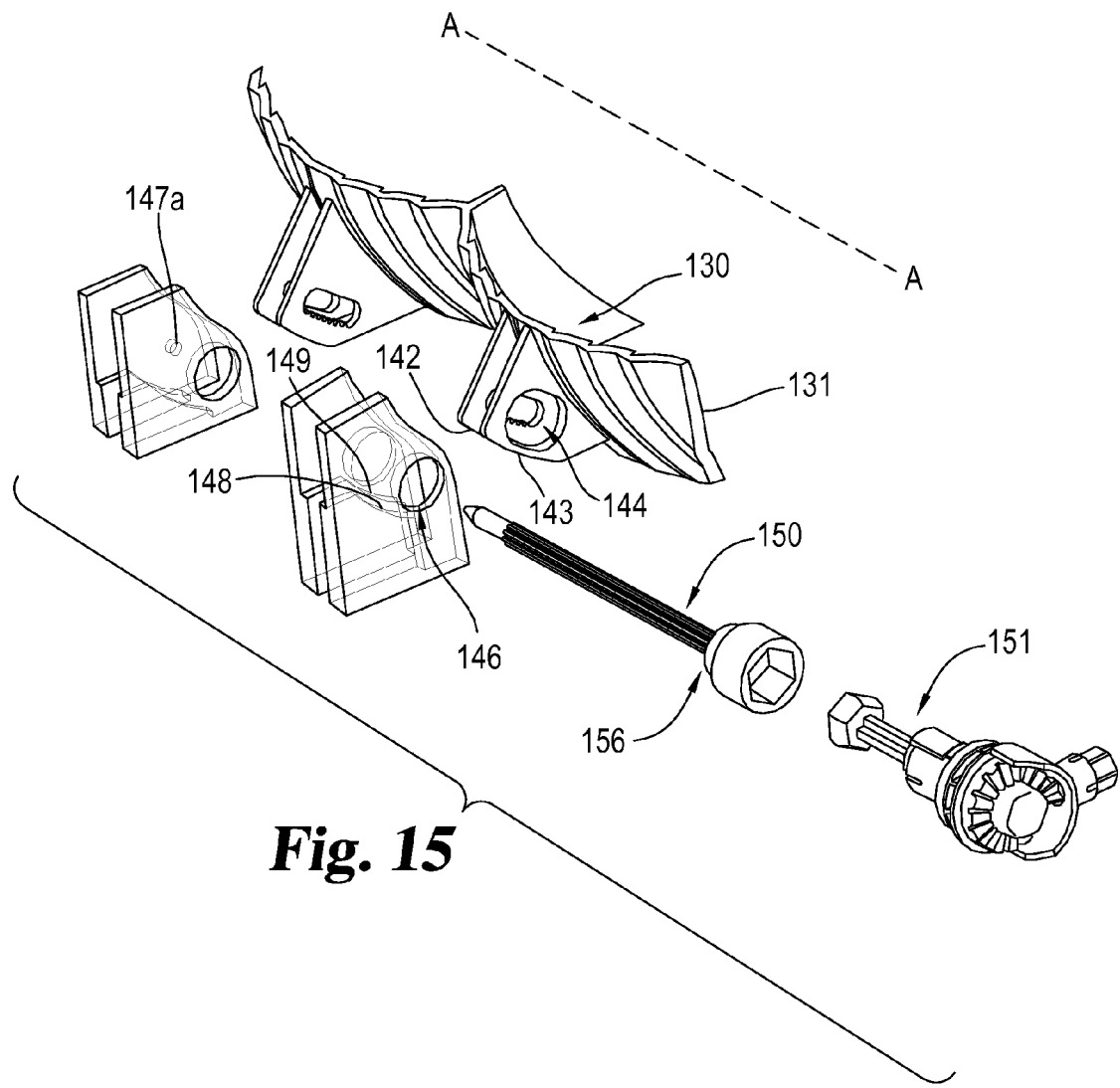
FIG. 15 is a top-rear exploded perspective view of selected elements of the assembly of FIG. 1.

Optionally, one may use a smooth shaft with one or more gears axially on it. Another option is where the gear comprises a shaft 150 having longitudinal gear splines 155 thereon, and further comprising one or more gear racks 145, 145a (preferably curved, but optional straight, such as with a floating shaft) engaging the gear splines 155 for simultaneous movement of the curved gear racks. The shaft may include one or more hubs 156, 157 supported and rotatable in one or more (normally circular) openings, 146 and 147, 147a (FIGS. 10, 14, 15) and/or passable through other openings 144 (FIG. 12). Another option is gears and/or gear spines that are non-circular in cross-section, forming one or more cams to move and revolve the reflector. When the reflector is moved around an axis, the axis A-A as shown in FIGS. 14 and 15 pass through and coincide with center of revolution $C_A$ (FIG. 8A).

Friction interfaces (rubber or otherwise) may be used in lieu of or in addition to gear interfaces to move a reflector. Or, another option is to move the reflector via pusher(s), puller(s), belt(s), bell crank(s), or otherwise. Movement of the reflector may be guided by slots, grooves, followers, ribs, projections, rollers and/or otherwise, alone or in combination.

Optionally, with the use of a shaft, the shaft may exit the housing 110, such as at opening 118 or otherwise, for user adjustment, be motorized, be manual, or otherwise. This provides the option of having the shaft exit the housing from one or more side of the housing, and providing the availability of side (as opposed to front or rear) adjustment. Driving the shaft may take any mechanical form, including motors, knobs, levers, etc. Also, optionally, an angled driver, such as a bevel gear driver 151 (covered in part by cover 152) may be used. This allows, for example, top access to a side drive for reflector adjustment.

As used here (claims, specification, and other definitions) the following terms have the following meaning.

Articles and phases such as, "the", "a", "an", "at least one", and "a first", and "comprising" and "including" here are not limited to mean only one, but rather are inclusive and open ended to also include, optionally, two or more of such elements and/or other elements. In terms of the meaning of words herein, literally different elements or words in dependent claims are not superfluous, and have different meaning and are not to be imported or implied or synonymous with elements or words in the claims from which they depend.

The term "and/or" is inclusive here, meaning "and" as well as "or". For example, "P and/or Q" encompasses, P, Q, and P with Q; and, such "P and/or Q" may include other elements as well.

The term "blur circle" means here an area or volume where light rays do not come to a perfect focus or do not originate from to provide perfectly collimated light, but never-the-less are sufficient to provide an acceptable light beam, and in the case of vehicle lamps to be FMVSS 108 compliant.

The term "center of revolution" means here the geometric point or axis in space around which something else may revolve (at least partially). The revolving may be circular or non-circular.

The term "circuit board module" means here one or more components combined with a circuit board to provide electrical power to a light source. This may include one or more of sub-circuit boards, solder, plugs, regulators, resistors, wires and mechanical mounting.

The term "coincident" means here occupying the same point or axis in geometric space.

The term "collimated light" is light whose rays are parallel.

The term "concave" means here shaped generally curved inwardly toward something else. Such curved shape may comprise one or more of circular, parabolic, complex, flat facets and/or other segments.

The term "curved track" means here a mechanical path along which one or more other parts may move and which is curved. The curve may be circular, complex or other curve (e.g. parabolic) and may also include one or more straight segments.

The term "curved path-of-movement" means here a path in geometric space along which one or more other parts may move and which is curved. The curve may be circular, complex or other curve (e.g. parabolic) and may also include one or more straight segments.

The term "direction" means here the path or vector from one point or surface to another.

The term "facing" means here directed towards something else.

The term "FMVSS 108 compliant" means here, meeting the candela, illuminated surface area and other requirements set forth by U.S. 49 C.F.R. §571.108.

The term "focal point" means here one or more of the point(s) and/or blur circles onto which collimated light parallel to the "Z-axis" or the axis of reference is focused. Typically, parabolic or spherical mirrors or other reflectors have a single focal point, whereas elliptical and hyperbolic mirrors or other reflectors have two such focal points.

The term "focus" means here one or more of the point(s) and/or blur circles where light rays originating from a point on the object converge. This may include one or more focal point(s).

The term "forwardly" means here in a forward direction. Preferably this is in a direction out of a lamp housing through a lamp lens.

The term "gear-gear rack interface" means here mechanical contact between a rotatable gear or splined shaft (and its teeth or splines) with a gear rack for translating rotary movement to longitudinal movement of the rack or vice versa.

The term "gear rack" means here a series of gear teeth along a longitudinal part or section. The longitudinal part or section may be straight, curved or both.

The term "heat sink" means here a mass that can absorb, conduct and dissipate heat energy.

The term "hinge-joint" means here a mechanical joint of at least two parts that can move angularly with respect to each other at a point or axis located at the joint. This includes without limitation a pivot, ball and socket, living hinge (such as a weakened area between parts), hinge, universal joint or otherwise.

The term "housing" means here an enclosure of the light source. It preferably includes one or more of sides (rear, top, bottom, left, right) or segments. It may be any shape (round, square, rectangular, oval, hexagonal, octagonal, irregular, a combination thereof, or otherwise). It may be of any material, but typically is one or more of metal or plastic. It may have one or more lens thereon, typically mounted of the front of the housing.

The term "illuminated surface area" means here with respect to vehicle lamps, per 49 C.F.R. §571.108, the effective projected luminous lens area (EPLLA), which means here the area of the orthogonal projection of the effective light-emitting surface of a lamp on a plane perpendicular to a defined direction relative to the axis of reference. Unless otherwise specified, the direction is coincident with the axis of reference.

The term "lateral" or "laterally" here means generally to the side of something in a direction along the X-axis and/or Y-axis.

The term "lateral opening" means here a hole or U-shaped opening in a lateral side.

The term "lateral side" means here the "side" other than either the top side or the bottom side.

The term "lens" means here a light transmissive cover, wall or other element. It may alter optics or not. It may be collimating or not. It may have parallel, convex and/or concave opposing surfaces, or not. It may blend or combine the foregoing optional attributes.

The term "LED" means here light emitting diode, including single diodes as well as arrays of LED's and/or grouped or separate multiple light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

The term "light" means here light which is visible to the naked human eye.

The term "light beam" means here a three dimensional volume of emitted light.

The term "light emitter" means here a device or devices which when electrically energized give off light, such as a bulb (incandescent, halogen or otherwise) or an LED, alone, in groups, arrays, separate multiple numbers, or otherwise.

The term "light reflective surface" means here a surface that reflects at least half of white light orthogonally projected thereon. It may be mirror or non-mirror. It may be white or non-white. It may be fully opaque or partially opaque. Its geometry may be, for example, portions of a plane (flat), parabola, hyperbola, circle, ellipse, oval (Cassini, Cartesian or otherwise) and/or their three-dimensional counterparts, as well as combinations (faceted, blended or otherwise) thereof.

The term "light source" means here an electrically powered source of light including one or more of incandescent bulb, halogen bulb and LED.

The term "light transmissive" means here permitting light to pass through it, such as being transparent, translucent, with or without tint, lenses, ridges and/or prisms.

The term "locatable" means located during at least one position along a path-of-movement.

The term "longitudinal gear splines" means here gear-like teeth extending along all or part of the length of a shaft.

The term "moisture" means here water or other liquid or vapor-condensate

The term "mounted" means here physically attached to or held in place. This may be direct or indirect (such as with intervening layers or other parts). This may be by one or more of fasteners, adhesives, conduits, snaps, threads, bayonets, brackets, over molded plastic, or otherwise.

The term "multiple compartment lamp" means here, per 49 C.F.R. §571.108, a device which gives its indication by two or more separately lighted areas which are joined by one or more common parts, such as a housing or lens.

The term "not" is closed, but only with respect to the element so modified.

The term "parabolic" means here in the shape of at least a portion of a parabola (including a parabolic cylinder shape) or paraboloid.

The term "pivot" means here to turn about a point or axis as well as a mechanical interface that allow such turning.

The term "radially inward" means here in a direction generally towards the center of a shape, surface or structure.

The term "reflector" means here a surface which reflects more than half of the light directed to it. It may be, for example, white, tinted or other color. Preferably it has a chrome colored or other mirror like reflective-ness.

The term "shaft" means here an elongated rigid member that can rotate along its longitudinal axis. It may be round or any other shape in cross section.

The term "side" of a housing means here all or a portion of a side wall of a housing other than either a rear of a housing or a front lens.

The term "single compartment lamp" means here a lamp device which is not a multiple compartment lamp.

The term "vehicle" means here a self-propelled or towed device for transportation, including without limitation, car, truck, bike, bus, boat, tank or other military vehicle, airplane, truck trailer, truck cab, boat trailer, other trailer, emergency vehicle, and motorcycle.

The term "X-axis" means here the geometric axis that is perpendicular to the Z-axis and the Y-axis, normally horizontal when the lamp is mounted to a vehicle. However, the lamp may be freestanding or mounted otherwise, such as rotated ninety degrees in a vertical orientation, in which case the X-axis and Y-axis are interchanged.

The term "Y-axis" means here the geometric axis that is perpendicular to the Z-axis and the X-axis, normally vertical when the lamp is mounted to a vehicle.

The term "Z-axis" means here the axis of reference. If the lamp is a vehicle lamp, then per 49 C.F.R. §571.108), namely this is the characteristic axis of the lamp for use as the direction of reference (H=0°, V=0°) for angles of field for photometric measurements and for installing the lamp.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Webster's dictionaries and Random House dictionaries.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A lamp, comprising:
a housing defining at least one opening through a side of said housing;
at least one light source mounted outside said housing arranged and configured to project light into said housing through said at least one opening;
a reflector inside said housing comprising a light reflective surface facing said light source;
wherein said at least one opening is between said light source outside said housing and said reflector inside said housing;
wherein said reflector and its light reflective surface is movable with respect to said light source along a curved path-of-movement of said reflector to reflect at least a portion of light from said source to provide an adjustable, generally forwardly directed light beam; and,
wherein said reflector does not have a hinge-joint about which to pivot.

2. The lamp of claim 1 wherein said curved path-of-movement defines a center of revolution radially inward thereof, wherein said center of revolution is locatable generally coincident with said light source.

3. The lamp of claim 2 wherein said concave light reflective surface is concave and has a focus locatable generally coincident with said light source, wherein movement of said reflector alters direction of the light beam.

4. The lamp of claim 3 wherein said light source comprises an LED, and wherein said LED is mounted on a side of said housing to emit light toward said reflector.

5. The lamp of claim 4 wherein said light reflective surface comprises a portion of a parabola which is lateral to a central Z-axis of the parabola.

6. The lamp of claim 5 wherein said light source comprises an LED mounted on a circuit board module, and wherein said LED and its circuit board module are readily removable from the lamp for replacement of said LED, and wherein said circuit board module is mounted to a metal heat sink, and wherein said heat sink is mounted to said housing externally of said housing and on a side of said housing.

7. The lamp of claim 6 wherein said circuit board module extends through said at least one opening and being removable through said side opening.

8. The lamp of claim 7 and further comprising a curved track along which said reflector is movable to cause said light reflective surface to move along said curved path-of-movement.

9. The lamp of claim 8 and further comprising a gear-gear rack interface to move said reflector's light reflective surface along a curved path-of-movement.

10. The lamp of claim 9 wherein said gear comprises a shaft having longitudinal gear splines thereon, and further comprising a plurality of curved gear racks engaging said gear splines for simultaneous movement of said plurality of curved gear racks.

11. The lamp of claim 4 wherein said light source comprises an LED mounted on a circuit board module, and wherein said LED and its circuit board module are readily removable from the lamp for replacement of said LED.

12. The lamp of claim 11 wherein said circuit board module is mounted to a metal heat sink, and wherein said heat sink is mounted to said housing externally of said housing and on a side of said housing.

13. The lamp of claim 1 wherein said light reflective surface is concave and is generally parabolic and has a parabola focal point locatable generally coincident with said light source, wherein movement of said reflector alters direction of the light beam.

14. The lamp of claim 1 wherein said light source comprises an LED, and wherein said LED is mounted on a side of said housing to emit light toward said reflector.

15. The lamp of claim 1 wherein said light reflective surface comprises a portion of a parabola which is lateral to a central Z-axis of the parabola.

16. The lamp of claim 15 wherein said light source comprises an LED mounted on a circuit board module, and wherein said LED and its circuit board module are readily removable from the lamp for replacement of said LED, and wherein said circuit board module is mounted to a metal heat sink, and wherein said heat sink is mounted to said housing externally of said housing and on a side of said housing.

17. The lamp of claim 1 and further comprising a curved track along which said reflector is movable to cause said light reflective surface to move along said curved path-of-movement.

18. The lamp of claim 1 and further comprising a gear-gear rack interface to move said reflector's light reflective surface along a curved path-of-movement.

19. The lamp of claim 18 wherein said gear comprises a shaft having longitudinal gear splines thereon, and further comprising a plurality of curved gear racks engaging said gear splines for simultaneous movement of said plurality of curved gear racks.

20. The lamp of claim 1, comprising:
a lens inside said housing between said at least one light source and said reflector, wherein light from said at least one light source passes through said lens before reaching said reflector.

21. A lamp, comprising:
a housing defining at least one opening through a side of said housing;
at least one light source positioned outside said housing arranged and configured to project light into said housing through said at least one opening;
a reflector inside said housing comprising a light reflective surface facing said light source;
wherein said at least one opening is between said light source outside said housing and said reflector inside said housing;

wherein said reflector and its light reflective surface is movable with respect to said light source along a curved path-of-movement of said reflector to reflect at least a portion of light from said light source to provide an adjustable, generally forwardly directed light beam; and, a curved track along which said reflector is movable to cause said light reflective surface to move along said curved path-of-movement.

22. The lamp of claim 21 and further comprising a gear-gear rack interface to move said reflector's light reflective surface along a curved path-of-movement.

23. The lamp of claim 22 wherein said gear comprises a shaft having longitudinal gear splines thereon, and further comprising a plurality of curved gear racks engaging said gear splines for simultaneous movement of said plurality of curved gear racks.

24. The lamp of claim 21 wherein said curved path-of-movement defines a center of revolution radially inward thereof, wherein said center of revolution is locatable generally coincident with said light source.

25. The lamp of claim 21 wherein said concave light reflective surface is generally parabolic and has a parabola focal point locatable generally coincident with said light source, wherein movement of said reflector alters direction of the light beam.

26. The lamp of claim 21 wherein said light source comprises an LED, and wherein said LED is mounted on a side of said housing to emit light toward said reflector.

27. The lamp of claim 21, comprising:
a lens inside said housing between said at least one light source and said reflector, wherein light from said at least one light source passes through said lens before reaching said reflector.

28. A lamp, comprising:
a housing defining at least one opening through a side of said housing;
at least one light source comprising an LED mounted outside said housing on a metal heat sink, wherein said heat sink is mounted to said housing outside of said housing and on a side of said housing, and wherein said light source arranged and configured to project light into said housing through said at least one opening; and
a concave reflector inside said housing comprising a light reflective surface facing said light source;
wherein said at least one opening is between said light source outside said housing and said reflector inside said housing; and
wherein said reflector and its light reflective surface is movable to provide an adjustable, generally forwardly directed light beam, and wherein said light reflective surface is movable along a curved path-of-movement which defines a center of revolution radially inward thereof, wherein said center of revolution is locatable generally coincident with said light source.

29. The lamp of claim 28 wherein said light reflective surface is concave and has a focus locatable generally coincident with said light source, wherein movement of said reflector alters direction of the light beam.

30. The lamp of claim 28 wherein said light source comprises an LED mounted on a circuit board module, and wherein said LED and its circuit board module are readily removable from the lamp for replacement of said LED.

31. The lamp of claim 28 and further comprising a curved track along which said reflector is movable to cause said light reflective surface to move along said curved path-of-movement.

32. The lamp of claim 28 and further comprising a gear-gear rack interface to move said reflector.

33. The lamp of claim 32 wherein said gear comprises a shaft having longitudinal gear splines thereon, and further comprising a plurality of gear racks engaging said gear splines for simultaneous movement of said plurality of gear racks.

34. The lamp of claim 28, comprising:
a lens inside said housing between said at least one light source and said reflector, wherein light from said at least one light source passes through said lens before reaching said reflector.

* * * * *